United States Patent [19]
Warren

[11] 3,937,167
[45] Feb. 10, 1976

[54] METHOD FOR UNLOADING AND TRANSFERRING EGGS

[75] Inventor: William H. Warren, Omaha, Nebr.
[73] Assignee: Henningsen Foods, Inc., White Plains, N.Y.
[22] Filed: Feb. 25, 1974
[21] Appl. No.: 445,577

[52] U.S. Cl.............. 214/152; 214/1 BV; 214/309
[51] Int. Cl.²......................................... B66C 23/00
[58] Field of Search ..... 214/1 B, 1 BB, 1 BC, 1 BD, 214/1 BS, 1 BT, 1 BH, 1 BV, 147 T, 14 TG, 8.5 D, 300, 6 P, 6 FS, 152, 309, 8.5 R, 8.5 A; 294/64, 65; 198/20 R, 34 R

[56] References Cited
UNITED STATES PATENTS

| | | | |
|---|---|---|---|
| 1,987,336 | 1/1935 | Powell | 214/309 X |
| 2,578,912 | 12/1951 | Waters | 214/309 |
| 2,702,644 | 2/1955 | Bruce | 214/309 |
| 3,215,289 | 11/1965 | Gleason | 214/8.5 A |
| 3,272,360 | 9/1966 | Van Der Schoot | 214/1 BV X |
| 3,398,841 | 8/1968 | Mohr | 214/8.5 R |
| 3,583,579 | 6/1971 | Triggs et al. | 214/8.5 A X |
| 3,587,888 | 6/1971 | Warren | 214/1 BV X |

Primary Examiner—Frank E. Werner
Attorney, Agent, or Firm—Holland, Armstrong, Wilkie & Previto

[57] ABSTRACT

Improved method and means are disclosed for transferring eggs from transportation trays to a row conveyor which feeds the eggs to washers or breakers or other devices. A single operator transfers loaded trays of eggs from stacks of trays to a transfer position. At the transfer position, the operator may inspect the trays and remove undergrade eggs and replace them with acceptable eggs. An egg transfer means then carries the eggs to an egg row conveyor. During the transfer, the egg spacing is adjusted if necessary from the tray spacing to the conveyor spacing. After the egg transfer, the transfer means returns to the pick-up point and proceeds through another cycle. Alternatively the transfer means may be set to await a signal from the operator before proceeding with another transfer cycle. During the transfer, the operator inspects the top trays at the pick-up position to clear them of untransferred eggs and to remove soiled trays, and then the operator places additional filled trays on the tops of the stacks of emptied trays for the next cycle. The emptied trays are stacked at the transfer position and the operator periodically removes the stacks and places them in a conveniently positioned carton or onto a removal conveyor.

8 Claims, 4 Drawing Figures

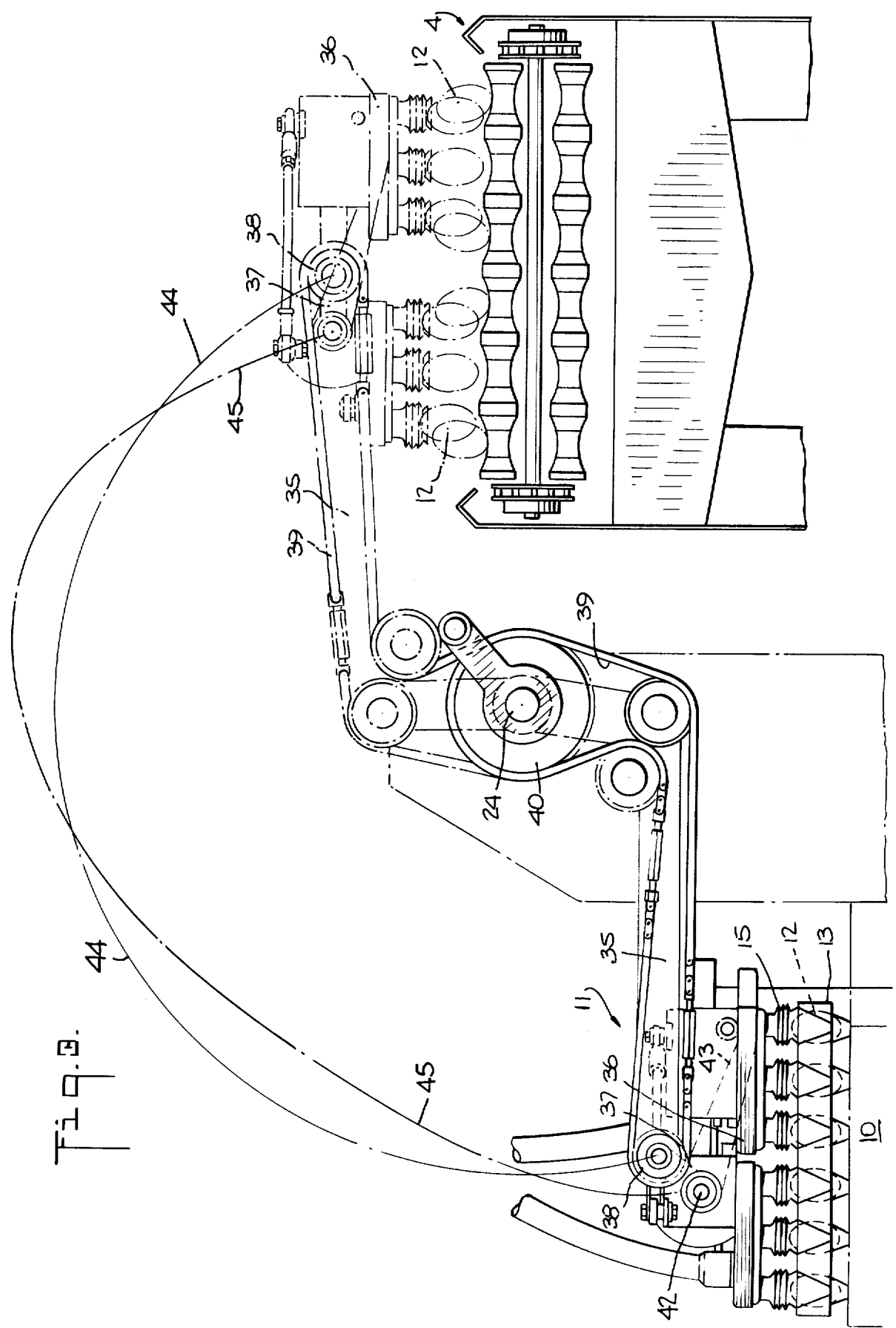

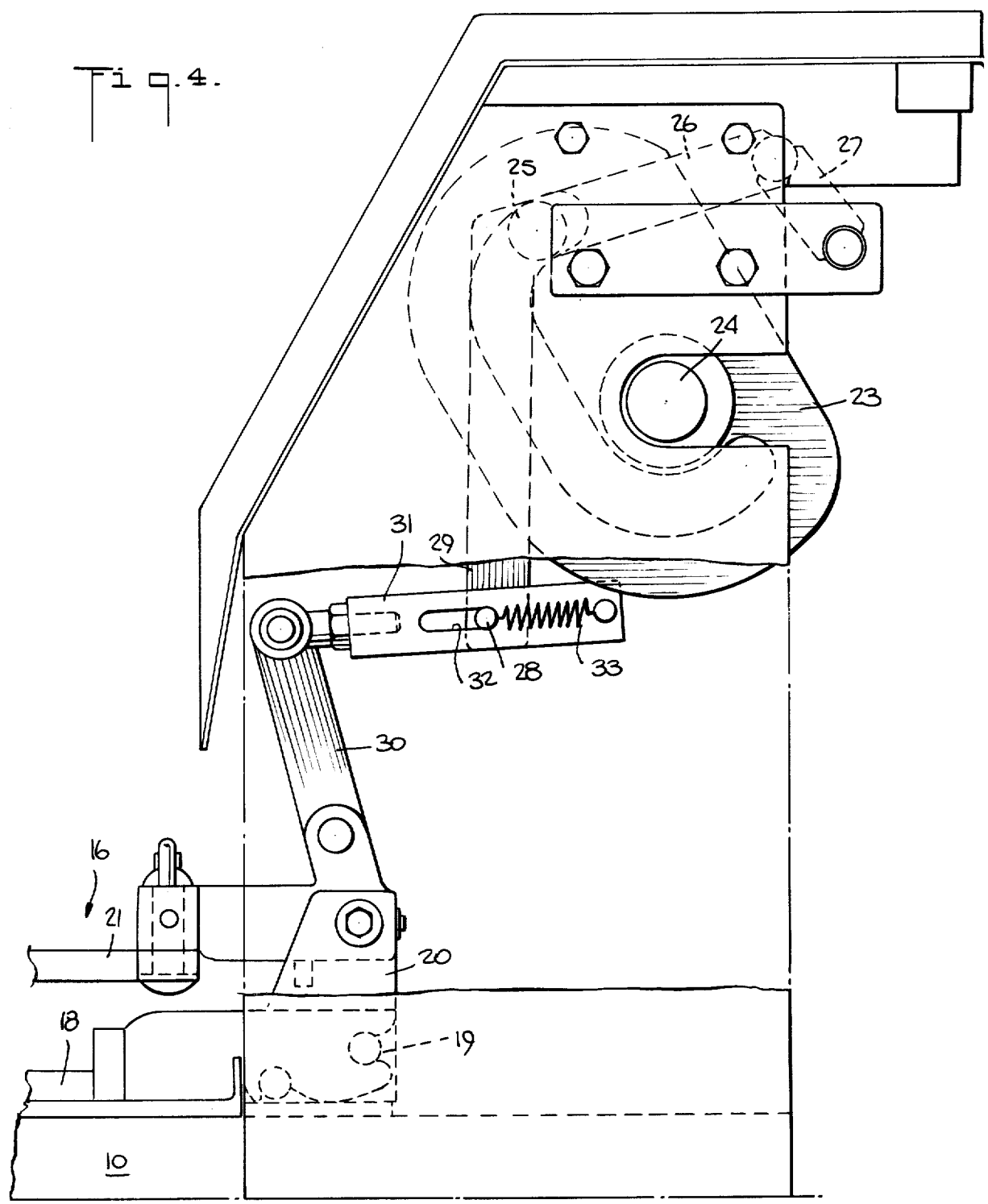

METHOD FOR UNLOADING AND TRANSFERRING EGGS

BACKGROUND OF THE INVENTION

The present invention relates to method and means for transferring articles from trays or cartons to row conveyors and more particularly to a method and means for transferring eggs from transportation trays to a row conveyor. In a number of egg processing operations, the eggs are initially stored and shipped in cartons with the eggs being placed on individual trays as, for example, with thirty eggs being positioned in rows on a tray and with a number of these trays being held in a case. Subsequent egg processing operations such as washing or grading or egg breaking require the eggs to be removed from the trays and to be positioned in rows on moving conveyors. An improved method and means for such a transfer are provided by this invention.

There are a number of different methods and means presently used for the operation of transferring eggs from trays to conveyors. These present methods and means, while satisfactory under certain conditions, have been found to be inefficient for a number of transfer operations and unadaptable to other egg transfer situations. These present methods and means have also been found to be inefficient in their use of an operator's time and to require unnecessary movements or motions by the operators and they also cannot efficiently handle trays of eggs of the minimum standards which are normally processed.

The improved transfer method and means permits borderline trays to be used in its regular mode of operation which is not satisfactorily done with prior methods or systems.

The method and means of the present invention also provide a high speed efficient egg transfer operation where the eggs are simply and conveniently fed to the transfer position in trays in their original case. At this position, the operator feeds the eggs in trays to the transfer means by a method which permits the operator to clear the trays of cracked or leaking eggs prior to egg transfer and to clear the trays of any untransferred eggs or to remove soiled trays as part of the continuous high speed egg transfer operation.

As contrasted with prior egg transfer operations of this general type, the operator need not move from the operating position to perform these steps or any of the other operating sequences which are part of this improved efficient high speed egg transfer operation.

Accordingly, an object of the present invention is to provide an improved and relatively simple high speed method and means for transferring eggs to a row conveyor.

Another object of the present invention is to provide an improved egg transfer means which permits an operator to clear objectionable eggs from egg trays and to replace them with acceptable eggs during the transfer operation without leaving an operating position.

Another object of the present invention is to provide an improved method and means for transferring eggs from trays to a conveyor which will satisfactorily handle soiled eggs or trays which may not be handled satisfactorily by prior methods or means.

Another object of the present invention is to provide an improved method and means for transferring eggs from trays to row conveyors where the trays are supplied to the transfer station in stacks or cases and the filled trays are placed directly into the transfer position.

Another object of the present invention is to provide an improved method and means of transferring eggs from trays to roller conveyors where a single operator conveniently handles one or more trays per transfer cycle.

Another object of the present invention is to provide an improved method and means for transferring eggs from trays or cases to a row conveyor in a relatively small area using apparatus which occupies only a minimal floor space.

Another object of the present invention is to provide a method and means of transferring eggs wherein the method steps and the size of the means permits a single operator to control either one or two units from a single operating position.

Another object of the present invention is to provide an improved method and means for transferring eggs from trays or cartons wherein the rate of transfer is adaptable for variations in operator's skill or may be adjusted for continuous operation to take advantage of favorable transfer conditions.

Another object of the present invention is to provide an improved method and means which requires no initial transfer of eggs from cartons or trays to an initial conveyor for transporting the eggs or the trays to the transfer position.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 3 is a side elevational view of a preferred embodiment of a transfer head.

FIG. 4 is a side elevational view of a preferred tray hold-down assembly.

DESCRIPTION OF THE PREFERRED EMBODIMENT

The method and means of this invention are used in an egg processing operation for transferring eggs from their transportation trays to a row conveyor which continuously or intermittently carries the eggs to washing or breaking or other egg processing apparatus. A convenient and standardized method of egg storage and distribution packages the eggs on contoured egg supporting trays where a typical tray will hold a number of eggs, such as thirty eggs in five rows of six eggs each. These trays are stacked one on top of another in a number of stacks within a case.

In the preferred method and means of this invention, the eggs are supplied directly to the egg transfer station in the cases where the case is supported at a convenient level adjacent to the operator of the transfer means.

Cartons may be brought to this point by a suitable carton conveyor or otherwise.

Figure 1:
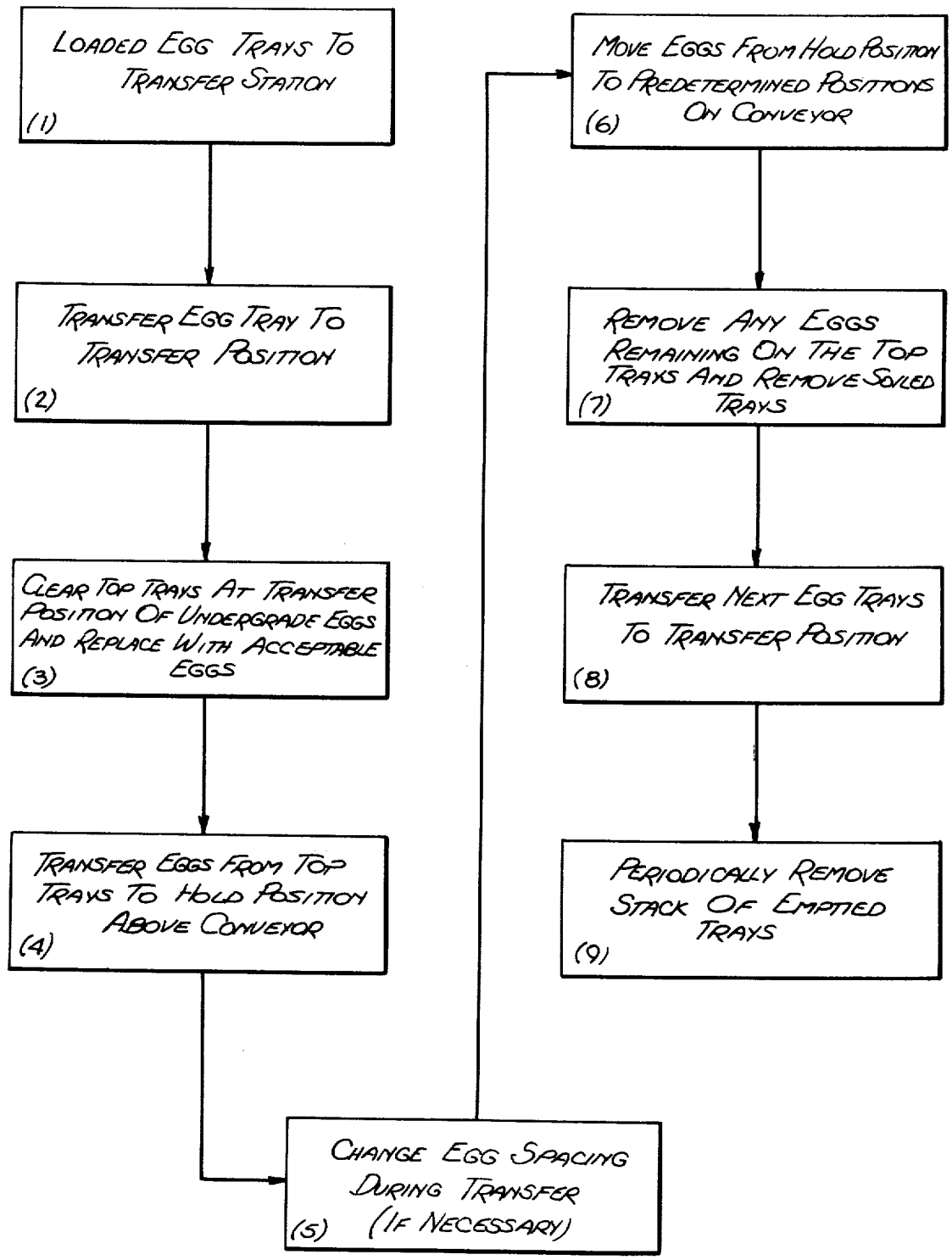
FIG. 1 is a diagram of a preferred embodiment of the method steps of the invention.

FIG. 1 gives the preferred steps of the method. These steps will now be described in connection with a general description of a preferred means for performing the steps.

The transfer means of the present invention comprises an egg tray receiving table 10 (FIG. 2) positioned adjacent to a support surface to which cases of egg trays are furnished (Step 1). The table 10 supports a pivotally mounted egg transfer head 11 which is positioned to engage and to lift eggs 12 from one or more trays 13 (FIG. 3) positioned on the table 10 (Step 2) by the operator and to carry these eggs 12 to a conveyor 14.

The preferred and most efficient method for transferring the trays of eggs, such as two standard egg trays, is for the operator to place each tray on the table 10 on the top of a stack of trays transferred from previous loading cycles. After the operator places the trays 13 on the tops of the stacks on the transfer table 10, a time period is available for the operator to inspect the eggs on the trays and to remove any objectionable eggs which may have checks or which may be soiled with egg liquid or other matter and to replace them with acceptable eggs (Step 3).

When the trays 13 are in position on table 10 and the objectionable eggs 12 have been removed and replaced, the operator presses a transfer switch 17 releasing the egg transfer head 11 so that it may thereafter move downwardly under the control of a timing system into engagement with the eggs 12 and carry the eggs 12 toward a position above the egg conveyor 14 (Step 4).

As the transfer head carries the eggs 12 to the conveyor 14 it changes the egg spacing, if necessary, to conform to the necessary egg and egg row spacing for the conveyor. The William H. Warren U.S. Pat. No. 3,542,224 dated Nov. 24, 1970 describes a suitable spacing adjustment means (Step 5).

A timing device on the conveyor 14 operates an egg release mechanism to release the eggs onto the egg conveyor 14 at the correct conveyor position (Step 6). Suitable egg transfer heads are illustrated, for example, in the William H. Warren U.S. Pat. Nos. 3,437,096 dated Apr. 8, 1969 and 3,587,888 dated June 28, 1971. Such transfer devices use resilient rubber egg chucks 15 and a vacuum source connected to the chucks 15 for engaging the eggs 12 and for carrying them between the trays 13 and the conveyor 14. A synchronized vacuum system of the type illustrated in the above referred to U.S. Pat. No. 3,437,096 may control the application and the release of the egg lifting vacuum force. The preferred transfer head provides for a difference in level between the eggs 12 on a tray 13 at the transfer table 10 and the level of the conveyor 14. The transfer device may include a leveling arrangement of the type illustrated in the above referred to U.S. Pat. No. 3,587,888 for maintaining the supported egg array in a horizontal position at both the pick-up and egg release levels.

After the transfer head 11 starts its motion toward the conveyor 14, the operator inspects the top trays 13. If any eggs remain they are removed and placed in a convenient container or waste bin depending upon their condition. If a top tray is soiled, it is removed from the stack for being handled and cleaned separately from the clean trays remaining in the stacks (Step 7).

A preferred arrangement of the transfer table 10 provides for the stacking of two adjacent stacks of egg trays 13. This permits the operator to continue to place filled trays 13 on top of the two stacks to build up two piles of trays 13 as the trays 13 are successively emptied by the operation of the transfer head 11. A pivotally mounted hold-down member 16 is provided for the top trays which is swung clear of the stacks after the transfer head 11 has lifted the eggs 12 at the commencement of the transfer cycle. This hold-down is spring loaded so that it may rise sufficiently to accommodate increases in the heights of the stacks of trays 13. The operator inspects the empty trays 13 to remove one if it is soiled (Step 7) and thereafter adds a filled tray to the top of each of the stacks (Step 8). The hold-down member 16 is pivoted downwardly to engage the top trays 13 on the stacks during the period of the transfer when the egg chucks 15 engage the eggs 12 and lift them clear of the trays 13.

Periodically, the operator removes the stacks of empty trays 13 from the transfer table 10 and places them on a suitable removal conveyor or in a conveniently placed case for reuse (Step 9).

FIG. 4 illustrates a preferred embodiment of the hold-down assembly 16. A series of parallel tray guide bars 18 are fitted into a suitable mounting bracket 19 so that they are positioned just above the table 10 and so that the bars 18 fit between egg compartments on the egg trays 13. In the embodiment illustrated in FIG. 2, for example, four bars 18 are shown for receiving and for aligning two stacks of trays 13. The hold-down assembly 16 is mounted on the table top 10 above the tray guide bars 18. It includes mounting brackets 20 to which the hold-down arms 21 and crosspieces 22 are pivotally attached. The hold-down arms 21 are swung upwardly to the raised tray loading position illustrated in FIG. 2 after the transfer head 11 has lifted the eggs 12 upwardly from the uppermost tray 13. This permits the operator to perform the clearing step 7 and then the tray loading steps 2 and 3 as the next filled trays are placed at the transfer position. The hold-down arms 21 are swung between their raised and lowered positions by a drive system including a cam drive wheel 23 attached to the drive shaft 24 for the transfer head 11. The cam wheel 23 is coupled to the hold-down arms 21 through the intermediation of a cam follower 25 mounted on a pivot arm 26. The pivot arm 26 is pivotally attached to the machine base at its upper end 27 and is pivotally attached by a pin 28 at its lower end 29 to a crank 30 by a spring loaded coupling lever 31. The coupling lever 31 includes an elongated slot 32 for receiving the coupling pin 28. A coil spring 33 urges the pin 28 towards the right hand end of the slot 32 and permits the hold-down arms 21 to swing upwardly to compensate for the rising stack of egg trays 13 as the pin 28 moves in the slot 32 against the force of the spring 33.

A preferred control system is utilized for the movement of the egg transfer head 11. The head is driven through its cycle by a suitable electric drive system of the type of above referred to U.S. Pat. No. 3,437,096. When the top trays have been inspected, the operator presses an activation switch 17. The switch 17 places the transfer head movement under the control of a regular timing cam causing the head 11 to swing downwardly from its raised position above trays 13 on the transfer table 10 and to engage the eggs 12 as vacuum is applied to the egg chucks 15 and to then move in the opposite direction to carry the eggs 12 to a release position above the conveyor 14. When the conveyor 14 has advanced to the proper egg receiving position, a cam (not shown driven by the conveyor 14 operates to cause the eggs 12 to be released and the transfer head 11 to swing back to its initial rest position. It is thus seen that the transfer head 11 makes one cycle as the conveyor 14 advances a sufficient amount to receive the transferred eggs 12. The activation switch 17, which is operated by the machine operator, therefore provides an over riding control so that the transfer operation only occurs if the trays 13 have been positioned and inspected and are ready for the transfer operation. If the trays 13 are not ready, the operator does not press the switch and no transfer will be made until the switch 17 is pressed and the conveyor 14 advances an additional distance for receiving another group of eggs. In the event that the loading is proceeding smoothly, the activation switch may be by-passed by a by-pass switch 41 (FIG. 2) and the machine may be put on full automatic control so that the egg transfer head 11 goes through its cycle each time that the egg conveyor advances a sufficient distance to receive a set of eggs, i.e., each time that the conveyor advances ten rows in the case where sixty eggs are being transferred, and where a six egg row is being used on the egg conveyor.

FIG. 3 illustrates a preferred embodiment of the mounting of the transfer head 11. The L-shaped support arms 35 are mounted on the drive shaft 24 so that the arms 35 move from their pick-up position, as illustrated in solid lines, to their discharge position as shown in dash-dot lines under the control of the drive shaft 24. The lifter plates 36 for the vacuum cups 15 are attached to the arms 35 by means or orbit links 37 each rotatably attached at one end to an arm 35 and at its opposite end to the lifter plate 36 support shaft 42.

A leveling means is employed to level the lifter plates 36 at the egg pick-up and discharge positions shown. This leveling means comprises a standard pantograph-type system including the endless chain 43.

Figure 2:
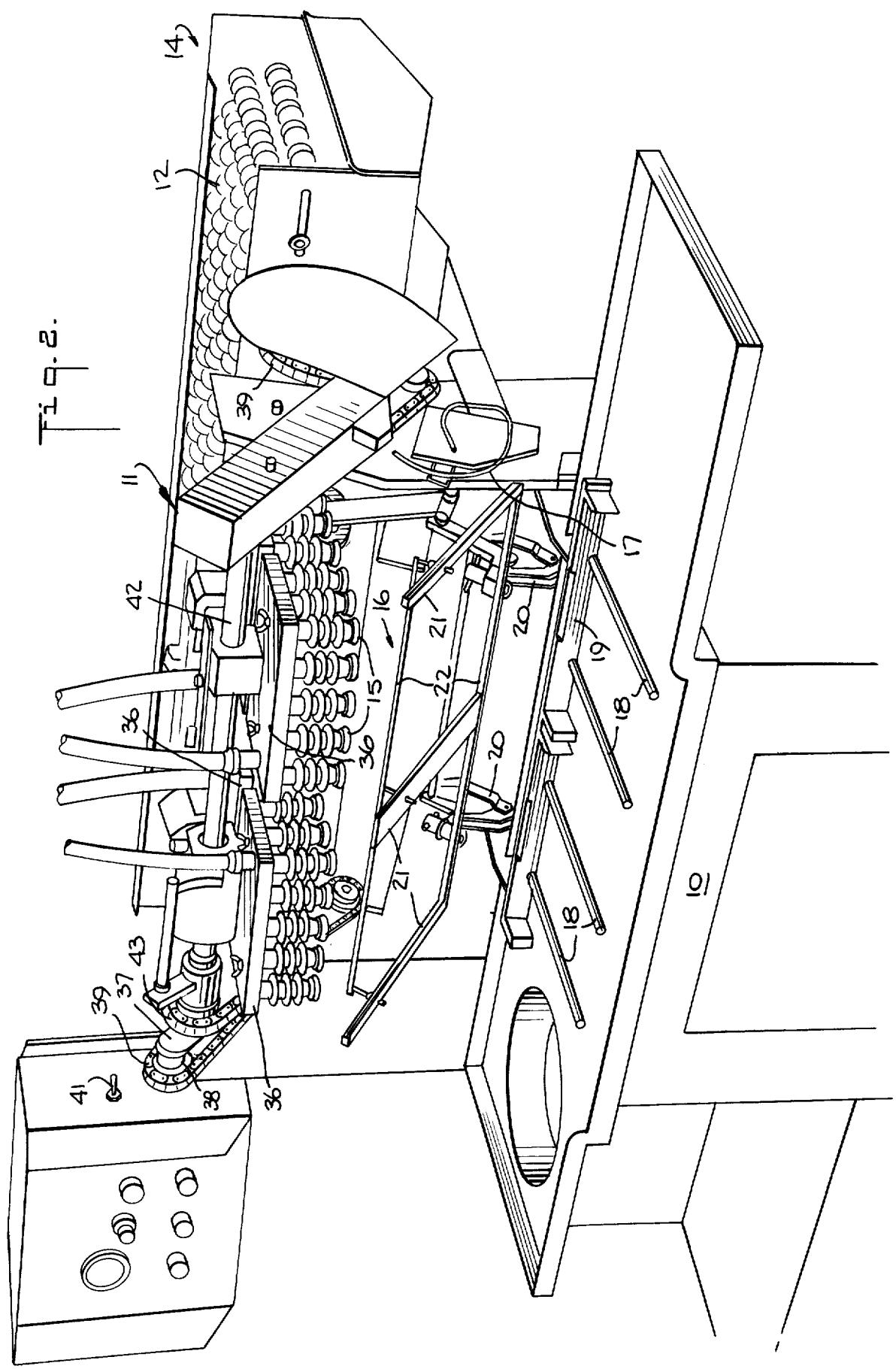
FIG. 2 is a perspective view of one embodiment of means for performing the method in accordance with the invention.

In FIG. 3, the arc 44 represents the paths of the outer ends of the arms 35 as they are moved to and from the egg pick-up and release positions. The curved line 45 represents a desired path of movement for support shaft 42 for the egg support plates 36 near the pick-up and release points to insure that the eggs 12 are picked up and released with a sufficiently vertical movement. This movement is obtained for the eggs 12 and their support plates 36 by a control system for the orbit links 37. This system, as illustrated in FIGS. 2 and 3 includes sprockets 38 attached to the orbit links 37 and fixed sprockets 40 connected by endless chains 39. The sprockets 38 and 40 are chosen to give the illustrated path 45 for the plate support shaft 42 and similar paths for the eggs 12 supported on the plates 36.

In order that the transfer head 11 accomodates itself to the increasing heights of the stacks of trays 13 on the table 10, the transfer head drive system preferably includes a spring coupling. The spring coupling is adjusted so that it compresses on the downward movement of the transfer head 11 against the eggs 12 in the uppermost trays. Alternatively or in addition, the trays 12 may be supported on a resilient support which compresses downwardly to maintain a generally constant stack top height under the action of the hold-down member 16.

The transfer method and means as described above are sufficiently compact so that two systems may be placed side by side or facing one another. With an operator positioned between systems and with egg cases being supplied at a convenient point, a single operator may handle both machines. The operation of a single machine or of two machines is facilitated by the above described transfer head 11 action where the transfer head 11 is spaced from the egg trays 13 for a major portion of the time of each transfer cycle. The transfer head 11 is preferably moved at considerably greater speed than the conveyor 14 speed thereby maximizing the dwell time for the transfer head 11 and minimizing the time during which the head 11 is in motion in front of the operator.

It will be seen that an improved method and means for transferring eggs from egg trays to conveyors has been described. The method and means provide particular efficiency in operation and in the utilization of space for a one-operator egg transfer position. In addition, the method and means will handle trays including eggs which present cleaning problems as these eggs are easily located and replaced by the operator with acceptable eggs. The operator may efficiently feed one or two transfer systems for high speed egg processing machines, such as washers or breakers and the like, without having to move away from the operating position and while at the same time monitoring the egg transfer so that objectionable eggs are removed from the transfer process. The stacks of emptied trays are easily removed from the egg pick-up position without the operator's leaving the operation position.

These improvements are obtained by the arrangement of the steps by which the transfer is accomplished as well as by the related means for the transfer. The physical movement of the eggs from the trays to the conveyor is performed at high speed with a gentle egg handling mode so that a relatively longer period between egg transfers becomes available to the operator for the related tray handling and egg and tray inspecting steps.

The improved method means are also effective, as more fully described below, to permit the transfer to be under the complete control of the operator whereby the transfer may be interrupted when necessary to prevent the entry of objectionable eggs or dirty trays into the egg or tray processing steps. These results are obtained with a system which is completely safe for the operator and which requires only relatively simple and physically undemanding motions by the operator as eggs arriving on trays in cases are transferred to the moving conveyor by the method and means of the invention.

As various changes may be made in the form, contruction and arrangement of the parts herein without departing from the spirit and scope of the invention and without sacrificing any of its advantages, it is to be understood that all matter herein is to be interpreted as illustrative and not in a limiting sens.

Having thus described my invention, I claim:

1. A method of unloading eggs from a series of successively oncoming trays and transferring said eggs to a conveyor comprising the steps of:

manually moving a tray to a horizontally fixed egg transfer pick-up position;

applying egg carrying means to the eggs in said tray;

operating said means to move said eggs from said tray onto a conveyor while said tray remains in said pick-up position;

then superposing a second tray of eggs on said empty first tray;

applying said egg carrying means to the eggs in said second tray; and operating said means to move said last named eggs onto said conveyor while said second tray remains superposed on said first tray.

2. The method as claimed in claim 1 which comprises the further step of changing the spacing of the eggs as they are carried to the conveyor.

3. The method as claimed in claim 1 which further comprises the step of removing eggs remaining in the trays at the pick-up position not carried to the conveyor.

4. The method as claimed in claim 1 which further comprises the step of periodically removing the stacked trays from the egg transfer pick-up position.

5. The method as claimed in claim 1 in which the step of carrying said eggs to said egg placing position is performed at fixed intervals of predetermined length.

6. The method as claimed in claim 1 which further comprises the step of holding down the trays at the pick-up position during the movement of the eggs therefrom and of releasing the trays thereafter.

7. The method as claimed in claim 1 which further comprises the step of carrying said eggs by a resilient drive means.

8. The method as claimed in claim 1 which further comprises the step of adjusting the egg carrying path adjacent to the pick-up and placing positions to facilitate releasing the eggs at a different level from the egg pick-up position level.

* * * * *